(12) United States Patent
Bengtsson

(10) Patent No.: US 7,874,759 B2
(45) Date of Patent: Jan. 25, 2011

(54) COUPLING FOR A PROPULSION SYSTEM

(75) Inventor: Bo Bengtsson, Torslanda (SE)

(73) Assignee: Marinvest Engineering AB, Gothenburg (SE)

( * ) Notice: Subject to any disclaimer, the term of this patent is extended or adjusted under 35 U.S.C. 154(b) by 523 days.

(21) Appl. No.: 11/663,455

(22) PCT Filed: Oct. 26, 2004

(86) PCT No.: PCT/SE2004/001560

§ 371 (c)(1),
(2), (4) Date: Mar. 22, 2007

(87) PCT Pub. No.: WO2006/046890

PCT Pub. Date: May 4, 2006

(65) Prior Publication Data

US 2009/0181778 A1     Jul. 16, 2009

(51) Int. Cl.
*F16L 23/00* (2006.01)
(52) U.S. Cl. ........................ 403/335; 403/337
(58) Field of Classification Search ......... 403/335–338; 464/162, 185, 182; 285/282
See application file for complete search history.

(56) References Cited

U.S. PATENT DOCUMENTS 643,081 A * 2/1900 Bullock (Continued)

FOREIGN PATENT DOCUMENTS

CH           380 454          9/1964

(Continued)

OTHER PUBLICATIONS

Office Action dated Feb. 15, 2008 for corresponding Chinese Application No. 200480443061 and English translation thereof.

(Continued)

*Primary Examiner*—Victor MacArthur
(74) *Attorney, Agent, or Firm*—Harness, Dickey & Pierce, P.L.C.

(57) ABSTRACT

The present invention relates to a coupling (1) for a ship propulsion system to be arranged between a first shaft section (3) and a second shaft section (5) of a propeller shaft, comprising a first radial surface (17) facing a second radial surface (19), said first and second radial surfaces (17, 19) are transversal to the axial extension of the first and second shaft section (3, 5), wherein said first and second radial surfaces (17, 19) are connectable into an axially engaged condition and disconnectable into an axially disengaged condition, wherein said first and second radial surfaces (17, 19) are rotationally secured relative to each other in said axially engaged condition by means of at least one shear-carrying element (27) seated in opposite recesses (23, 25) arranged in the first radial surface (17) and the second radial surface (19), respectively, taking up shear forces directed substantially parallel to said first and second radial surfaces (17, 19), each of said opposite recesses (23, 25) comprises an open end facing the other one, wherein said at least one shear-carrying element (27) in said axially engaged condition abuts an axial abutment surface provided in the vicinity of each of said recesses (23, 25) for provision of a distance (29) between the first radial surface (17) and the second radial surface (19).

20 Claims, 2 Drawing Sheets

U.S. PATENT DOCUMENTS

| | | | | |
|---|---|---|---|---|
| 1,650,557 | A | * | 11/1927 | Weingartner |
| 3,116,619 | A | * | 1/1964 | Spielbauer |
| 3,404,545 | A | * | 10/1968 | Walker |
| 3,662,567 | A | * | 5/1972 | Condon et al. ............... 403/336 |
| 4,219,286 | A | * | 8/1980 | Lindenthal .................. 403/338 |
| 4,515,495 | A | | 5/1985 | Trouillet |
| 5,031,400 | A | | 7/1991 | Boyd |
| 6,378,681 | B1 | | 4/2002 | Themsen |

FOREIGN PATENT DOCUMENTS

| | | | |
|---|---|---|---|
| CH | | 380454 | 11/1964 |
| CN | | 1107172 | 4/2003 |
| DE | 102 35 286 | A1 | 2/2004 |
| DE | 102 36 677 | A1 | 2/2004 |
| EP | 1 051 327 | | 11/2000 |
| FR | | 693932 | * 11/1930 |
| GB | | 920385 | 3/1963 |
| GB | 1335907 | A | * 10/1973 |

OTHER PUBLICATIONS

Office Action dated Apr. 24, 2009 for corresponding European Application No. 04793860.0.

\* cited by examiner

COUPLING FOR A PROPULSION SYSTEM

FIELD OF THE INVENTION

The present invention relates to a coupling for a ship propulsion system to be arranged between a first shaft section and a second shaft section of a propeller shaft, comprising a first radial surface facing a second radial surface, said first and second radial surfaces (17, 19) are transversal to the axial extension of the first and second shaft section (3, 5), wherein said first and second radial surfaces are connectable into an axially engaged condition and disconnectable into an axially disengaged condition.

TECHNICAL BACKGROUND

A coupling device for a propulsion system of the kind disclosed in the preamble of claim 1 is usually used for ships, and in particular for disconnection of the main drive source in case of an emergency situation or an auxiliary situation, wherein the propulsion system may be driven by an accessory drive source.

Generally such coupling devices are operated either manually or hydraulically. Regarding the manually operated coupling devices, the handling of the disconnection and reconnection of the coupling may be time consuming and imply hard work for the operator. Further the fit and tolerances for such manually operated coupling devices can be critical and therefore associated with high production costs and accurate assembly.

DE10235286 describes a propeller shaft clutch for separating or making a drive connection between a drive machine and a propeller. The clutch is a hydraulically operated toothed coupling with externally toothed coupling hubs and an inner toothed coupling sleeve which is axially displaceable on the coupling hubs. Such hydraulically operated coupling devices generally have a complicated and expensive structure. Another issue regarding hydraulically operated coupling devices is often the heavy weight and the space requiring design.

Hence, there is a need for an improved coupling device for a ship propulsion system, and in particular a coupling device that is suitable to operate and cost-effective to produce.

SUMMARY OF THE INVENTION

An object of the invention is to provide a coupling for a propulsion system which is suitable for arrangement between a first shaft section and a second shaft section of a propeller shaft, in particular for a propulsion system which is connectable during normal service and disconnectable during emergency or auxiliary service.

Another object of the invention is to provide a coupling that at least partially overcomes the above issues.

These and other objects, which will become apparent in the following description, are achieved by means of a coupling having the features defined in the appended claims.

According to a first aspect of the invention, a coupling for a ship propulsion system to be arranged between a first shaft section and a second shaft section of a propeller shaft is provided, comprising a first radial surface facing a second radial surface, said first and second radial surfaces are transversal to the axial extension of the first and second shaft section, wherein said first and second radial surfaces are connectable into an axially engaged condition and disconnectable into an axially disengaged condition, wherein said first and second radial surfaces are rotationally secured relative to each other in said axially engaged condition by means of at least one shear-carrying element seated in opposite recesses arranged in the first radial surface and the second radial surface, respectively, taking up shear forces directed substantially parallel to said first and second radial surfaces, each of said opposite recesses comprises an open end facing the other one, wherein said at least one shear-carrying element in said axially engaged condition abuts an axial abutment surface provided in the vicinity of each of said recesses for provision of a distance between the first radial surface and the second radial surface.

A particular advantage of the invention is that the disconnection and reconnection of said coupling may be comfortably executed. In particular, the risk of mechanical components which are difficult to release during the disconnection of the coupling is reduced and thereby a coupling is provided that facilitates a time-saving disconnection and reconnection of said coupling.

Another advantage of the invention is the provision of a coupling that may carry appreciable thrust loads whilst one of the shaft sections is rotating and the other one is stationary. A further advantage is that certain angular and alignment deficiencies may be absorbed in operation of the propulsion system.

Yet another advantage of the invention is the provision of a coupling with a space-effective structure, which fulfils the requirements of functionality. Further, the space-effective structure provides for a coupling with a substantially low weight compared to the prior art.

Additionally one advantage of the invention is the provision of a coupling which is associated with a beneficial production proceeding.

In at least one embodiment, the abutment surface in the vicinity of each recesses may either be provided by a bottom surface of said recesses or by the radial surfaces of the coupling. Alternatively, the abutment surface may be provided by any other feature suitable for an axially contact with a corresponding feature of the at least one shear-carrying element.

According to at least one preferred embodiment, the axially engaged condition is accomplished by means of at least one mechanical element which mainly carrying an axial load. The at least one mechanical element may preferably be provided as a bolt or other conventional fastening means. Alternatively the at least one mechanical element may be provided as clamps, hooks, springs etc. However, the principal purpose of the at least one mechanical element is to carrying axial loads and axially connecting the first and second radial surfaces.

Advantageously, each of said opposite recesses are arranged with an opening extending through the periphery of its corresponding radial surface. Further, each of said opposite recesses preferably has a major extension in the radial direction of its corresponding radial surface.

In a preferred embodiment of the invention, said opposite recesses are provided as at least one radially extending hole arranged through the periphery of the first and second radial surfaces.

By arranging said recesses with an open end through the periphery of the radial surfaces, the shear-carrying elements may be easily inserted in and removed from said recesses. In one embodiment, each of said recesses has an open end directed towards the corresponding radial surface and a closed end directed away from said radial surface.

Preferably, said at least one shear-carrying element is provided as a cylindrical elongate element, such as a dowel pin. According to a preferred embodiment, the first and second radial surfaces are rotationally secured relative to each other in said axially engaged condition by means of at least 3 shear-carrying elements, preferably at least 6 shear-carrying elements and especially at least 10 shear-carrying elements.

Preferably, said at least one shear-carrying element, in the axially engaged condition, is maintained in position in relation to the recesses by axially tighten the first and second radial surfaces. The shear-carrying element is thereby securely seated in the opposite recesses. In one preferred embodiment of the invention, at least one shear-carrying element with a radial extension is securely clamped between the first and second radial surfaces when tightened together.

According to at least one alternative embodiment of the invention, said opposite recesses may be arranged with an axial extension relative to said first and second radial surfaces. Hence, the at least one shear-carrying element preferably has an axial extension as well. Preferably, at least one of said recesses is provided with a thread which constituting said abutment surface in the vicinity of the corresponding radial surface.

Advantageously, the at least one shear-carrying element may be threaded secured in a through hole arranged in one of the radial surfaces and axially abutting a opposite recess in the other radial surface. In an alternative embodiment, the at least one shear-carrying element may axially abutting the radial surface which facing the other radial surface provided with the threaded through hole.

According to at least one preferred embodiment, at least one axial bearing device constitutes an axial force transferring interface between the first shaft section and the second shaft section. Preferably, at least one spring element is provided between said axial bearing device and a first opposite surface of said coupling in order to force the axial bearing device to abut against a second opposite surface of the coupling.

The at least one axial bearing device provides for a low friction relative rotational movement between the first radial surface and the second radial surface in the disengaged condition of the coupling, wherein axial forces may be transferred between the first shaft section and the second shaft section. Preferably, the coupling is provided with two axial bearings which allowing transmission of axial forces in two directions.

Advantageously, an intermediate housing is arranged for transmission of axial forces between said first shaft section and said second shaft section in said axially disengaged condition. Said intermediate housing constitutes an axial force transferring element which may establish an axially connection between the first shaft section and the second shaft section in said axially disengaged condition of the coupling. Preferably, the intermediate housing is attached to the one of the shaft sections that is not intended to rotate in the disengaged condition, even though it shall be understood that the opposite relation is feasible.

According to at least one embodiment, a disc shaped portion is arranged for cooperation with the intermediate housing for transmission of axial forces between said first shaft section and said second shaft section in said axially disengaged condition. The disc shaped portion is preferably arranged to abut a contact surface of the housing or any device arranged between the intermediate housing and the disc shaped portion. Preferably, the above mentioned at least one axial bearing is provided between the disc shaped portion and the intermediate housing, wherein a low friction relative rotational movement between the disc shaped portion and the intermediate housing may be established. According to one preferred embodiment, an axial bearing may be provided at each side of the disc shaped portion for provision of a two directional low friction axial force transmission. It is obvious for a person skilled in the art that the disc shaped portion may be shaped in several optional ways as long as it supports the interaction with the intermediate housing.

According to one embodiment, said intermediate housing is arranged on a driving shaft section and said disc shaped portion is arranged on a driven shaft section of the coupling during normal service.

In at least one embodiment, an axial play between the first shaft section and the second shaft section in said axially disengaged condition is smaller than said distance between the first radial surface and the second radial surface in said axially engaged condition. Hence, the first and second radial surfaces may be kept away from contacting each other in the axially disengaged condition of the coupling, wherein axially forces preferably are transmitted between the first and second shaft section by means of the disc shaped portion and the intermediate housing.

According to additionally one preferred embodiment, at least one of said first and second radial surfaces is adapted to rotate freely in relation to the other one in said axially disengaged condition by removing said at least one shear-carrying element seated in said opposite recesses. Further, said first and second radial surfaces preferably are connectable into the axially engaged condition by means of at least one bolt, preferably more than 3 bolts, and especially more than 6 bolts. Advantageously, said at least one bolt is at least partially freely fitted. In one preferred embodiment, said at least one bolt are freely fitted in a through hole arranged in one of the radial surfaces and threaded engaged in an opposite hole provided in the other radial surface, wherein the first and second radial surfaces may be axially connectable. It is to be noted that in this application the term "freely fitted" is used to define a condition there the bolt may substantially not carrying any shear forces, but mainly axial forces. Hereby, the shear forces are substantially carried by the at least one shear-carrying element in the axially engaged condition of the coupling.

According to a preferred embodiment of the invention, an electrical device is operable as a generator driven by the first or second shaft section in the axially engaged condition during normal service and said electrical device is operable as a motor driving the first or second shaft section in the axially disengaged condition, during auxiliary or emergency service. The coupling according to the invention may be easily applied to common shaft systems, especially in ships.

BRIEF DESCRIPTION OF THE DRAWINGS

By way of examples, embodiments of the invention will now be described with reference to the accompanying drawings in which:

FIG. 1b shows a cross sectional view taken from section I-I in FIG. 1a; and

DETAILED DESCRIPTION OF PREFERRED EMBODIMENTS

Figure 1A:
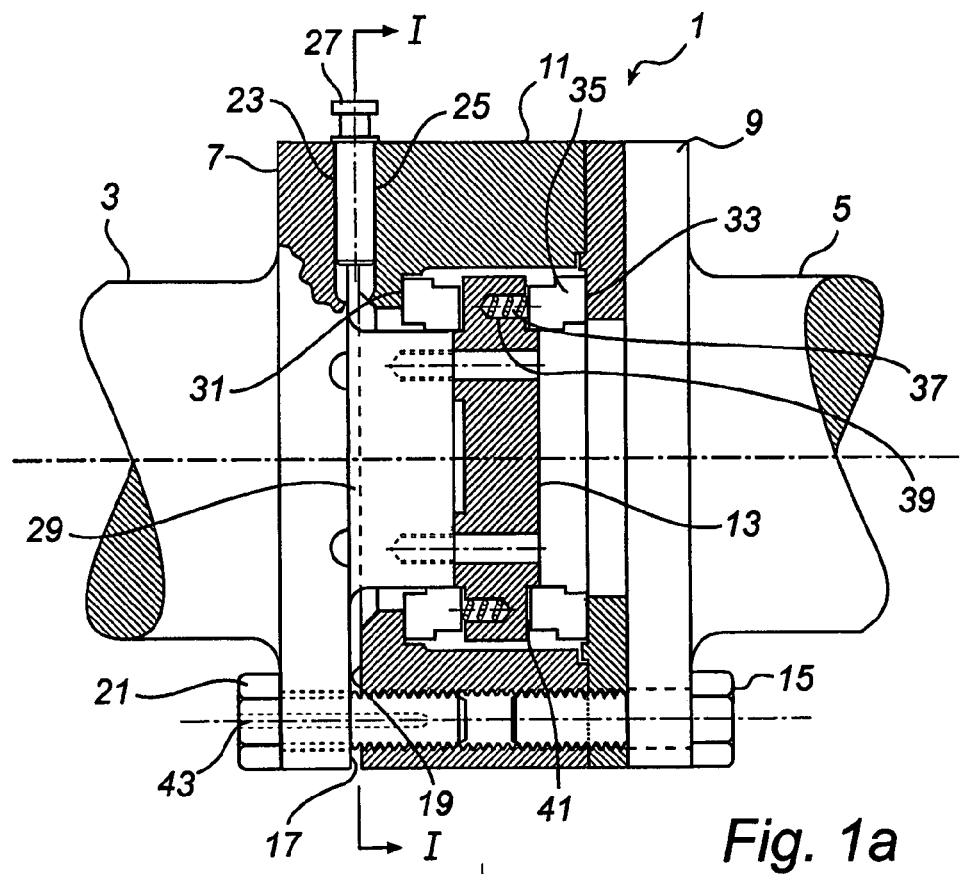
FIG. 1a shows a schematic view, partially in cross section, of a coupling according to the invention in an axially engaged condition.
Figure 1B:
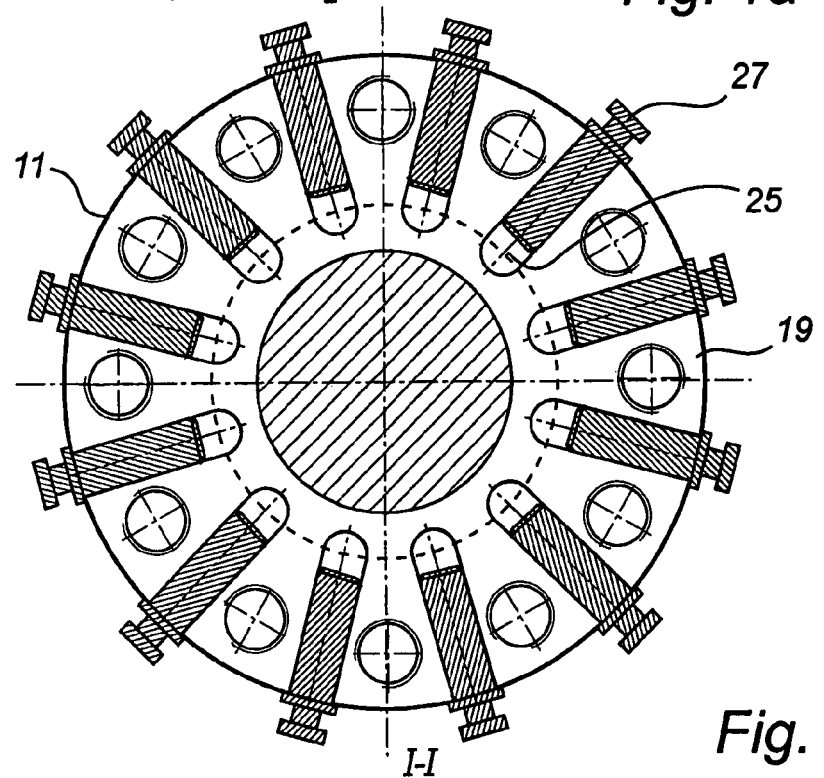
Figure 2:
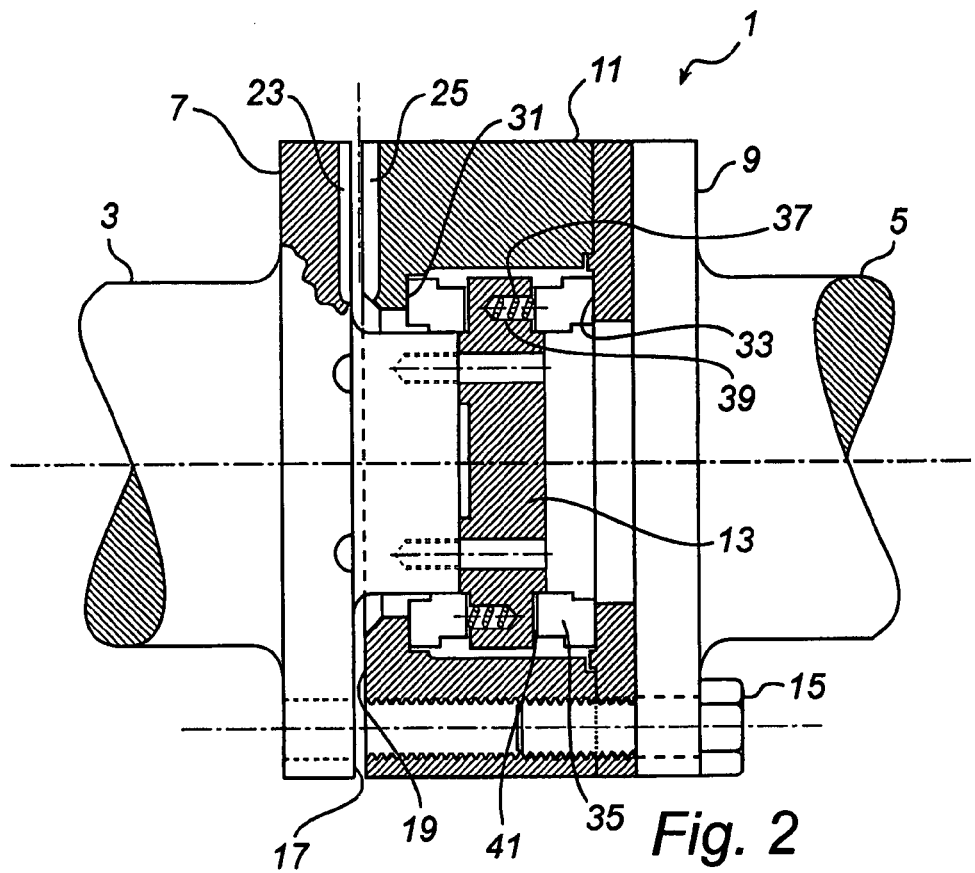
FIG. 2 shows a schematic view, partially in cross section, of the coupling according to FIG. 1 in an axially disengaged condition.

The coupling 1 for a ship propulsion system shown in FIGS. 1*a*-2, to be arranged between a first shaft section 3 and a second shaft section 5 of a propeller shaft, comprises a first flange portion 7 connected to one of said shaft sections 3, 5, a second flange portion 9 connected to the other shaft section 3, 5 and an intermediate housing 11 provided between said first and second flange portions 7, 9.

According to the embodiment shown in FIGS. 1*a*-1*b*, the second shaft section 5 is a driving shaft section connected to a main engine (not shown) and the first shaft section 3 is a driven shaft section drivable by the second shaft section 5 during normal service of the propulsion system. For instance, the first driven shaft section 3 is arranged for operation of a propeller of a propulsion system. However, it is obvious for a person skilled in the art that the relation between the shaft sections 3, 5 may be the opposite, wherein the first shaft section 3 may be the driving one and the second shaft section 5 may be the driven one.

The first shaft section 3 is provided with a disc shaped portion 13 located in the vicinity of the distal end of the first shaft section 3. Further, the first shaft section 3 is provided with said first flange portion 7 located inside the disc shaped portion 13. The second shaft section 5 is provided with said second flange portion 9 located in the vicinity of the distal end of the second shaft section 5. It shall be noted that the disc shaped portion 13 and the flange portions 7, 9 either may be provided as integral parts of the shaft sections 3, 5 or may be attached to the shaft sections 3, 5 by way of separate parts.

The intermediate housing 11 is attached to the second flange portion 9. Preferably, the intermediate housing 11 is connected with the second flange portion 9 by means of bolts 15, or other conventional fastening means. In an alternative embodiment of the invention, the intermediate housing 11 may constitute an integral part of the second shaft section 5. Additionally, the intermediate housing 11 either may be provided as one continuous part or may be made up of several assembled parts. However, it shall again be noted that the opposite relation is feasible, wherein the intermediate housing 11 may be connected to the first shaft section 3 and the disc shaped portion 13 may be connected to the second shaft section 5.

Said first flange portion 7, provided on the first shaft section 3, has a first radial surface 17 and the intermediate housing 11 has a second radial surface 19, wherein said first and second radial surfaces 17 and 19 are arranged facing each other. Said first and second radial surfaces 17 and 19 are located transversal in relation to the first and second shaft sections 3 and 5. Additionally, the first radial surface 17 and the second radial surface 19 are connectable into an axially engaged condition and disconnectable into an axially disengaged condition by means of mechanical elements 21, such as bolts or other conventional fastening means. For alternative embodiments of the invention, it shall be noted that the radial surfaces 17 and 19 may be axially secured by other mechanical means, such as clamps, springs, hooks etc. Additionally, the flanges may be replaced by other means, such as ears etc.

According to FIGS. 1*a*-1*b*, the first radial surface 17 is provided with recesses 23 facing opposite recesses 25 provided in the second radial surface 19. Each pair of opposite recesses 23 and 25 is adapted to receive a shear-carrying element 27 in the axially engaged condition of the coupling 1. When seated in the recesses 23 and 25, the shear-carrying elements 27 rotationally secure the first and second radial surfaces 17 and 19 relatively to each other by taking up forces directed substantially parallel to said radial surfaces 17 and 19. The shape and function of the shear-carrying elements 27 may be provided in several optional ways, which will be described more in detail further on.

In the illustrated preferred embodiment of the invention shown in FIGS. 1*a*-1*b*, the shear-carrying elements 27 seated in the recesses 23 and 25 establishing a distance 29 between the first and second radial surfaces 17 and 19 in the axially engaged condition of the coupling 1. Said distance 29 between the first and second radial surfaces 17 and 19 results from the fact that the recesses 23, 25 have a limited depth and thus not allow contact between said radial surfaces when the shear-carrying element 27 are inserted. The dimension of said distance 29 is thereby determined by the shape of the recesses 23, 25 and the shape of the shear-carrying elements 27. The distance 29 between the first and second radial surfaces 17, 19 are preferably more than 1 mm, in particular more than 3 mm and especially more than 5 mm.

In the axially engaged condition, a motion of rotation may be transferred from the first shaft section 3 to the second shaft section 5. In a preferred embodiment, the coupling 1 according to the invention, in its axially engaged condition, is used for transmission of a turning torque between a driving shaft section connected with a main engine and a driven shaft section connected with a propeller.

The coupling 1 is disconnectable into an axially disengaged condition by releasing the bolts 21, wherein the shear-carrying elements 27 may be removed from its seated position in the recesses 23, 25 provided in the radial surfaces 17, 19. In said axially disengaged condition the first shaft section 3 is arranged to rotate freely in relation to the second shaft section 5, and vice versa. According to a preferred embodiment of the invention, the axially disengaged condition may be used for emergency or auxiliary services. In the disengaged condition during emergency or auxiliary conditions, the first shaft section 3 may be driven by an electrical device operated as a motor (not shown), which electrical device preferably may be operated as a generator driven by the first shaft section 3 during normal service.

In the axially disengaged condition of the coupling, as illustrated in FIG. 2, the first shaft section 3 and the second shaft section 5 remain axially in contact. In the axially disengaged condition, axially forces may be transferred between the first shaft section 3 and the second shaft section 5 by cooperation between the disc shaped portion 13 and the intermediate housing 11. Said disc shaped portion 13 is accommodated within said intermediate housing 11 between a first contact surface 31 and a second contact surface 33. Hence, axial forces may be transmitted with one of the shaft sections 3, 5 rotating and the other one stationary. In a ship installation this means that axial thrust from the propeller may be transmitted to a thrust bearing in the main engine during the disengaged condition of the coupling 1.

As shown in FIG. 2, an axial bearing device 35 is preferably provided at each side of the disc shaped portion 13. The axial bearing devices 35 functions as axial force transferring interfaces for transmission of axial forces between the first shaft section 3 and the second shaft section 5 in the disengaged condition of the coupling 1. Preferably, at least one spring element 37 is provided between the disc shaped portion 13 and each of the axial bearings 35, wherein the axial bearings 35 are forced to abut against the first and second contact surfaces 31, 33 of the intermediate housing 11, respectively.

Said spring element 37, preferably a helical spring, is suitably seated in a recess 39 arranged in the disc shaped portion 13. Further, the axial bearings 35 provides for a low friction relative rotation between the first shaft section 3 and the second shaft section 5 in the disengaged condition of the coupling.

A radial play, as seen in FIGS. 1a-1b and 2, is preferably provided between the intermediate housing 11 and the axial bearings 35, wherein the axial bearings 35 merely are brought into contact with the intermediate housing 11 via the first and second contact surfaces 31, 33.

The first contact surface 31 is preferably formed by a first shelf arranged as a circumferential inner surface of the intermediate housing 11, which first contact surface 31 has an extension in a direction towards the centre of the intermediate housing 11. Alternatively, the first contact surface 31 may be arranged as one or several protruding portions. Further, the shelf either may be constituted as an integral part of the intermediate housing 11 or arranged as a separate part to be fitted inside the intermediate housing 11. Likewise, the second contact surface 33 is preferably formed by a second shelf arranged as a circumferential inner surface of the intermediate housing 11. Alternatively, the second shelf may be constituted by the second flange portion 9 of the second shaft section 5. The first and second contact surfaces 31, 33 makes it possible to transfer axial forces between the first shaft section 3 and the second shaft section 5 in both axial directions of the coupling 1.

In the disengaged condition of the coupling 1, an axial play 41 is preferably arranged between the disc shaped portion 13 and the intermediate housing 11, wherein the disc shaped portion 13 is allowed to move in the axial direction relatively to the intermediate housing 11. In one preferred embodiment shown in FIG. 2, the axial play 41 is supplied between the disc shaped portion 13 and the axial bearings 35. The axial play 41 between the first shaft section 3 and the second shaft section 5, in the disengaged condition of the coupling, is smaller than the distance 29 between the first radial surface 17 and the second radial surface 19 in the engaged condition of the coupling 1. Accordingly, the transmission of axial forces between the first shaft section 3 and the second shaft section 5, in the disengaged condition, is allowed without contact between the first radial surface 17 and the second radial surface 19, wherein at least one of the radial surfaces 17, 19 may rotate independently of the other one.

According to an especially preferred embodiment of the invention, the distance 29 between the first and second radial surfaces 17, 19 in the engaged condition is more than 5 mm and the axial play 41 between the first and second shaft section 3, 5 in the disengaged condition is less than 1 mm.

In an embodiment of the invention according to FIGS. 1a-1b, the shear-carrying elements 27 are maintained in the seated position between the radial surfaces 17, 19 by axially tighten the first and second radial surfaces 17, 19, for instance by means of bolts 21 or other fastening means as mentioned above. Hence, the shear-carrying elements 27 seated in the opposite recesses 23, 25 are clamped between the radial surfaces 17, 19. The shear-carrying elements 27 shown in FIGS. 1a-1b is shaped as cylindrical elongate elements, such as dowel pins. It shall be noted that the shear-carrying element may be provided with several alternative shapes, such as a sphere, a quadratic or rectangular pin, a tapered pin etc., wherein the opposite recesses 23, 25 having a suitable shape allowing a proper receiving of said shear-carrying element 27.

According to FIG. 1b, each of the opposite recesses 23, 25 preferably is arranged as parts of holes extending in a parallel direction of the first and second radial surfaces 17, 19. The recesses 23, 25 are preferably arranged with an open end extending through the periphery of the first and second radial surfaces 17, 19. Thereby, the shear-carrying elements 27 may be inserted through the opening in the periphery of the first and second radial surfaces 17, 19, whereupon the radial surfaces 17, 19 may be tightened together into the axially engaged condition. Advantageously, the shear-carrying elements 27 are provided with a portion intended to protrude beyond the periphery of the radial surfaces 17, 19, wherein the protruding part provides for a suitably holding interface to be used when the shear-carrying elements 27 may be removed from the recesses 23, 25 or inserted in the recesses 23, 25.

The recesses 23, 25 shown in FIGS. 1a-2 are preferably produced by axially connecting the first and second radial surfaces 17, 19 with a distance element located between said surfaces (not shown). Thereafter, the radial holes are drilled through the periphery of the radial surfaces 17, 19 in a radial direction towards the centre of the coupling 1. Preferably, the recesses 23, 25 are substantially equally spaced apart from each other along the periphery of the radial surfaces 17, 19.

In order to achieve a appropriate form fit between the opposite recesses 23, 25 and the shear-carrying elements 27, said drilled holes preferably are reamed in order to obtain a suitable tolerance of the diameter. After the production of the recesses 23, 25, the distance element between the first and second radial surfaces 17, 19 is removed and hence the radial surfaces 17, 19 may be axially connected with the shear-carrying elements 27 positioned between said radial surfaces 17, 19.

In a preferred embodiment of the invention, the first radial surface 17 and the second radial surface 19 are rotationally secured relative to each other by means of at least 3 shear-carrying elements 27, preferably 6 shear-carrying elements 27, and especially at least 10 shear-carrying elements 27.

With reference to FIGS. 1a-1b, the bolts 21 for the axially connection of the first and second radial surfaces 17, 19 are preferably provided with an at least partially free fitted extension through the first flange portion 7. The free fitted arrangement of the bolts 21 imply that the bolts 21 substantially not may take up any shear forces in the axially engaged condition of the coupling 1. The arrangement of free fitted bolts 21 has, among other things, the advantage of less critical tolerances during production of the corresponding bolt holes.

The bolts 21 are preferably provided with a heating element, such as a electric resistor heater. For instance, an axially extending hole 43 is arranged in the centre of each of the bolts 21, which hole 21 may have an open end through the end surface of the bolt-head. Said heating element, not shown, is intended to be inserted in said hole in the bolt 21. When the bolt 21 shall be loosen, the heating element is activated and the subsequent axially thermal expansion of the bolt 21 facilitating the disengagement of the bolt 21 by losing possibly pretensions. Thereby, the bolts 21 may be loosen easily and rapidly.

According to an alternative embodiment of the invention, the radial extending recesses 23, 25 and the shear-carrying elements 27 may be threaded engaged.

In yet an alternative embodiment, the insertion depth of the radial extending shear-carrying elements 27 in the recesses 23, 25 may be varied, wherein the shear-carrying elements 27 may be used as counter weights for balancing of the coupling 1.

Figure 3:
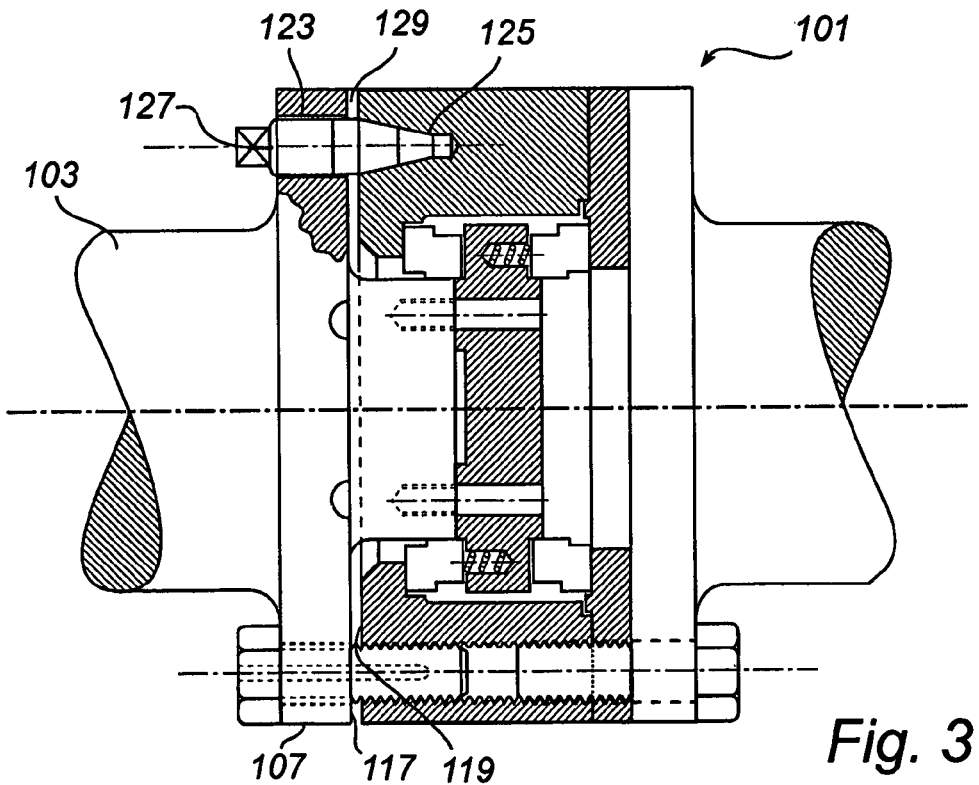
FIG. 3 shows a schematic view, partially in cross section, of an alternative embodiment of a coupling according to the invention.

According to an alternative embodiment shown in FIG. 3, the distance 129 between the first and second radial surfaces 117, 119, in the axially engaged condition, is provided by shear-carrying elements 127 having an axial extension. Said axially extending shear-carrying elements 127 are suitably-shaped as cylindrical dowel pins with a tapered end portion, which are seated in recesses 125 with a corresponding shape provided in the second radial surface 119. Further, the axially extending shear-carrying elements 127 preferably are seated with a threaded connection in recesses 123 provided in the first radial surface 117. In the embodiment shown in FIG. 3, each of the shear-carrying elements 127 is threaded arranged in a recess 123 provided as an axial through hole arranged in the flange portion 107 of the first shaft section 103. The depth of engagement in said threaded axial through hole determines the length of the part of said shear-carrying element 127 that protruding beyond the first radial surface 117, and consequently the distance 129 between the first and second radial surface 117, 119 in the axially engaged condition is determined by said protruding length.

In additionally one alternative embodiment of the invention, the shear-carrying elements 27;127 may be made of a resilient material or provided with a surface layer established by a resilient material. The resilient material results in a deformation of the shear-carrying element 27;127 when clamped between the first and second radial surfaces 17;117, 19;119 in the axially engaged condition of the coupling 1;101. Thus, the form fitting of the shear-carrying elements 27;127 in the recesses 23;123 and 25;125 may be enhanced and the tolerances of the recesses may be less accurate.

As mentioned above, the shape of the shear-carrying elements 27;127 may be provided in several optional ways. Likewise, the shape of the recesses 23;123 and 25;125 may be provided in several optional ways. For instance, the recesses 23;123 and 25;125 may be shaped as V-grooves, parts of spherical recesses, circular holes, tapered holes, etc., wherein the shear-carrying element 27;127 may has a corresponding shape for suitable form fitting in the corresponding recess 23;123 and 25;125.

The invention claimed is:

1. A coupling for a shaft of a ship propulsion system, the shaft comprising a first shaft section, a second shaft section, and a connecting device to be arranged between the first shaft section and the second shaft section, the coupling comprising:

a first radial surface facing a second radial surface, said first and second radial surfaces are transversal to an axial extension of the first and second shaft section, wherein said first and second radial surfaces are connectable into an axially engaged condition and disconnectable into an axially disengaged condition, wherein said first and second radial surfaces are rotationally secured relative to each other in said axially engaged condition by at least one shear-carrying element seated in opposite recesses arranged in the first radial surface and the second radial surface, respectively, taking up shear forces directed substantially parallel to said first and second radial surfaces, each of said opposite recesses comprises an open end facing the other one, wherein said at least one shear-carrying element in said axially engaged condition abuts an axial abutment surface provided in a vicinity of each of said recesses for provision of a distance between the first radial surface and the second radial surface, wherein an axial play between the first shaft section and the second shaft section in said axially disengaged condition is smaller than a distance between the first radial surface and the second radial surface in said axially engaged condition, wherein in the axially disengaged condition, the first and second shaft sections are arranged to rotate freely in relation to each other, and wherein in the axially disengaged condition, transmission of axial forces between the first and second shaft sections is allowed without contact between the first radial surface and the second radial surface.

2. The coupling of claim 1, wherein the axially engaged condition is accomplished by at least one mechanical element which mainly carries an axial load.

3. The coupling of claim 1, wherein each of said opposite recesses are arranged to form an opening extending through peripheries of the first and second radial surfaces.

4. The coupling of claim 1, wherein one of said opposite recesses has a major extension in a radial direction of the first radial surface and the other of said opposite recesses has a major extension in a radial direction of the second radial surface.

5. The coupling of claim 1, wherein said opposite recesses are provided as at least one radially extending hole arranged through the periphery of the first and second radial surfaces.

6. The coupling of claim 1, wherein said at least one shear-carrying element is provided as a cylindrical elongate element.

7. The coupling of claim 6, wherein the at least one shear-carrying element is a dowel pin.

8. The coupling of claim 1, wherein said first and second radial surfaces are rotationally secured relative to each other in said axially engaged condition by at least 3 shear-carrying elements.

9. The coupling of claim 1, wherein said at least one shear-carrying element, in the axially engaged condition, is maintained in position in relation to the recesses by axially tightening the first and second radial surfaces.

10. The coupling of claim 1, wherein said opposite recesses are arranged with an axial extension relative to said first and second radial surfaces.

11. The coupling of claim 10, wherein one of said recesses is provided with a thread constituting said abutment surface.

12. The coupling of claim 1, wherein at least one axial bearing device constitutes an axial force transferring interface between the first shaft section and the second shaft section.

13. The coupling of claim 12, further comprising:

at least one spring element pressing the axial bearing device against a surface of the connecting device.

14. The coupling of claim 1, further comprising:

an intermediate housing between said first shaft section and said second shaft section in said axially disengaged condition.

15. The coupling of claim 14, further comprising:

a disc shaped portion in the intermediate housing for transmission of axial forces between said first shaft section and said second shaft section in said axially disengaged condition.

16. The coupling of claim 15, wherein one of said first and second shaft sections is a driving shaft section and the other shaft section is a driven shaft section, said intermediate housing is arranged on a driving shaft section and said disc shaped portion is arranged on a driven shaft section.

17. The coupling of claim 1, wherein at least one of said first and second radial surfaces are adapted to rotate freely in relation to the other one in said axially disengaged condition by removing said at least one shear-carrying element seated in said opposite recesses.

18. The coupling of claim 1, wherein said first and second radial surfaces are connectable into the axially engaged condition by at least one bolt.

19. The coupling of claim 18, wherein said at least one bolt is at least partially freely fitted.

20. The coupling of claim 1, wherein an electrical device is operable as a generator driven by the first or second shaft section in the axially engaged condition during normal service and said electrical device is operable as a motor driving the first or second shaft section in the axially disengaged condition during auxiliary or emergency service.

* * * * *